No. 725,149. PATENTED APR. 14, 1903.
W. SAENGER.
FOLLOWER FOR PACKING SAUER KRAUT, &c.
APPLICATION FILED AUG. 9, 1902.
NO MODEL.

Witnesses:

Inventor:
William Saenger.
by
Atty.

UNITED STATES PATENT OFFICE.

WILLIAM SAENGER, OF ELMENDORF, TEXAS.

FOLLOWER FOR PACKING SAUER-KRAUT, &c.

SPECIFICATION forming part of Letters Patent No. 725,149, dated April 14, 1903.

Application filed August 9, 1902. Serial No. 119,123. (No model.)

*To all whom it may concern:*

Be it known that I, WILLIAM SAENGER, a citizen of the United States, residing at Elmendorf, in the county of Bexar and State of Texas, have invented certain new and useful Improvements in Followers for Packing Sauer-Kraut, &c., of which the following is a specification.

This invention relates to a novel, simple, and useful device adapted to hold sauer-kraut or other articles submerged under pressure in water, brine, or other liquid; and it consists in a follower formed in one integral piece of earthenware or other suitable material.

The invention relates, further, to various details and combination of parts, which will hereinafter be more fully described and then defined in the claims.

Figure 1:
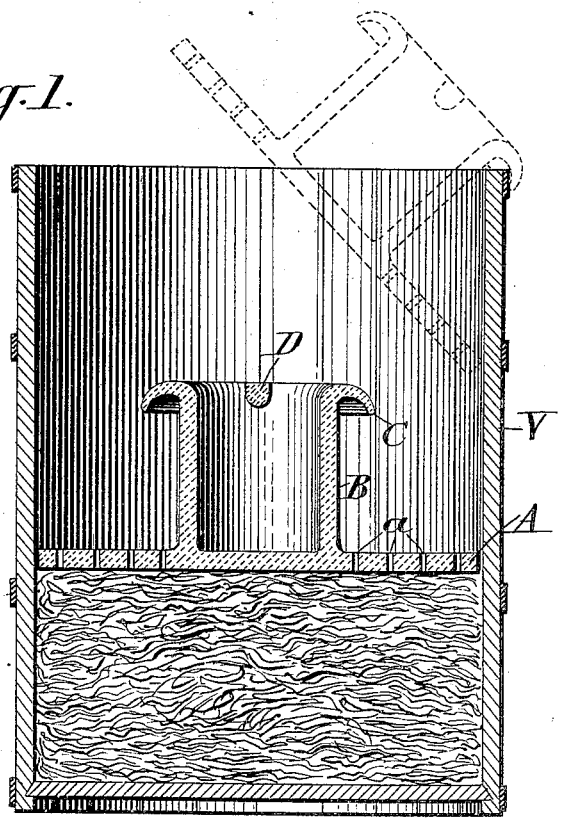
Figure 2:
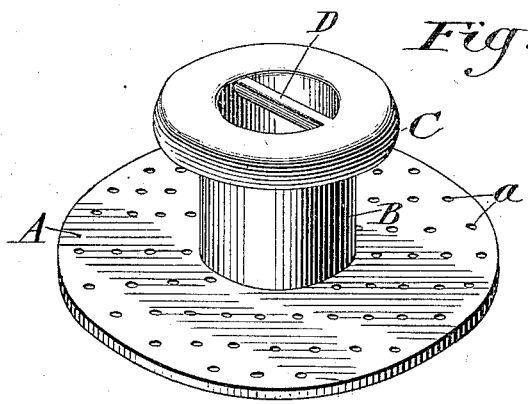

In the accompanying drawings, in which similar letters indicate similar parts, Figure 1 is a cross-section of a vessel with my improvement in position for submerging articles in said vessel and also showing in dotted lines the follower in position for permitting access to the contents of the vessel. Fig. 2 is a perspective view of the follower.

A designates a disk provided with perforations *a* to permit the rising of the liquid displaced by the disk. Rising centrally from the disk is a stem B, preferably formed as a hollow tube. Diametrically across the upper end of the stem B is a handle D, said handle preferably being sunk below the upper surface of the stem to obviate breakage and to facilitate handling. The stem B is provided at its upper end with an outwardly-flaring barrel-engaging rim C, slightly concave on its under surface in its preferred embodiment.

When it is desired to take the kraut or other article out of the vessel, the rim C is hooked over the upper edge of the vessel, as shown in dotted lines in Fig. 1, the perforated disk A hanging on the inner side of the vessel, so as to permit the liquid to run back into the vessel. The engagement of the rim with the edge of the vessel prevents the follower from falling back thereinto.

It is desirable that the follower be made of earthenware or other heavy material, so that its own weight may keep the kraut or other article submerged beneath the brine.

Having thus described my invention, what I claim as new, and desire to secure by Letters Patent, is—

1. An earthenware follower for packing in vessels comprising a perforated disk, a hollow stem rising centrally therefrom, a handle sunk into said stem, and an outwardly-extending rim around the upper end of said stem, said rim being concave on its under surface, substantially as described.

2. An earthenware follower for packing in vessels comprising a perforated disk, a hollow tubular stem rising centrally therefrom a handle diametrically across the upper end of said stem and sunk below the upper surface thereof, and an outwardly-extending rim around the upper end of said stem, said rim being concave on its under surface, substantially as described.

3. In combination with a barrel or other vessel, of an earthenware follower, formed in one integral piece, comprising a perforated disk, a stem rising centrally therefrom, a handle diametrically across the upper end of said stem, and barrel-engaging rim around the upper end of said stem, substantially as described.

WILLIAM SAENGER.

Witnesses:
GUS J. GEYER,
ROBT. T. NEILL.